W. F. FOLMER.
PHOTOGRAPHIC EXPOSING APPARATUS.
APPLICATION FILED JAN. 8, 1919.
1,383,395.
Patented July 5, 1921.
5 SHEETS—SHEET 5.
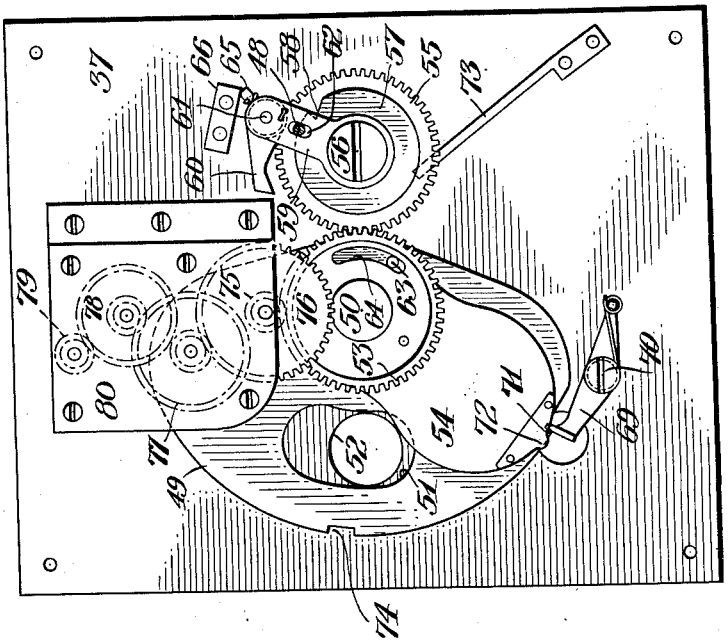
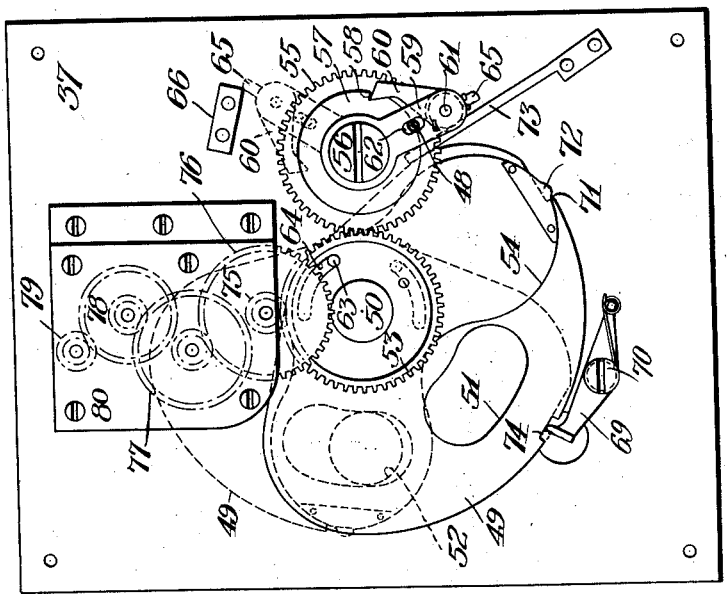
INVENTOR
William F. Folmer
BY
his ATTORNEYS
Witnesses:

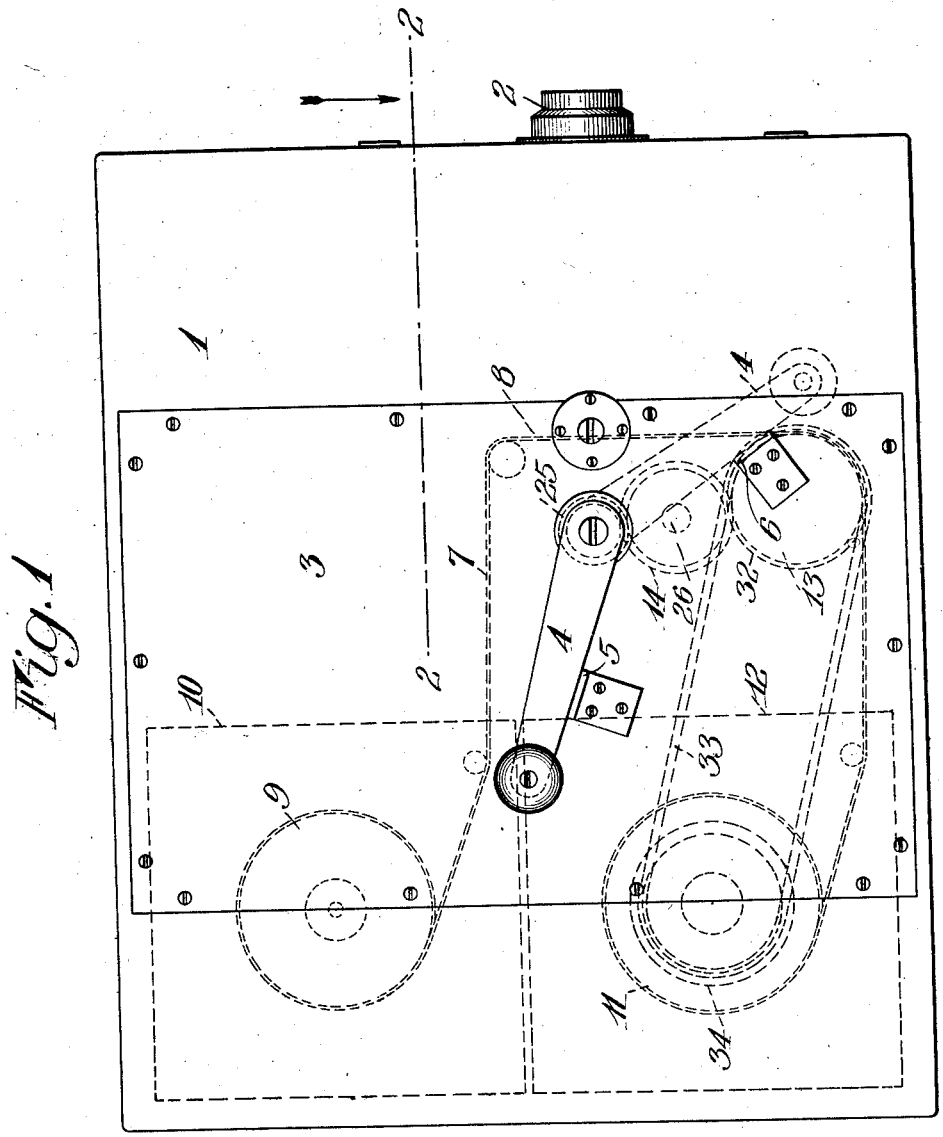

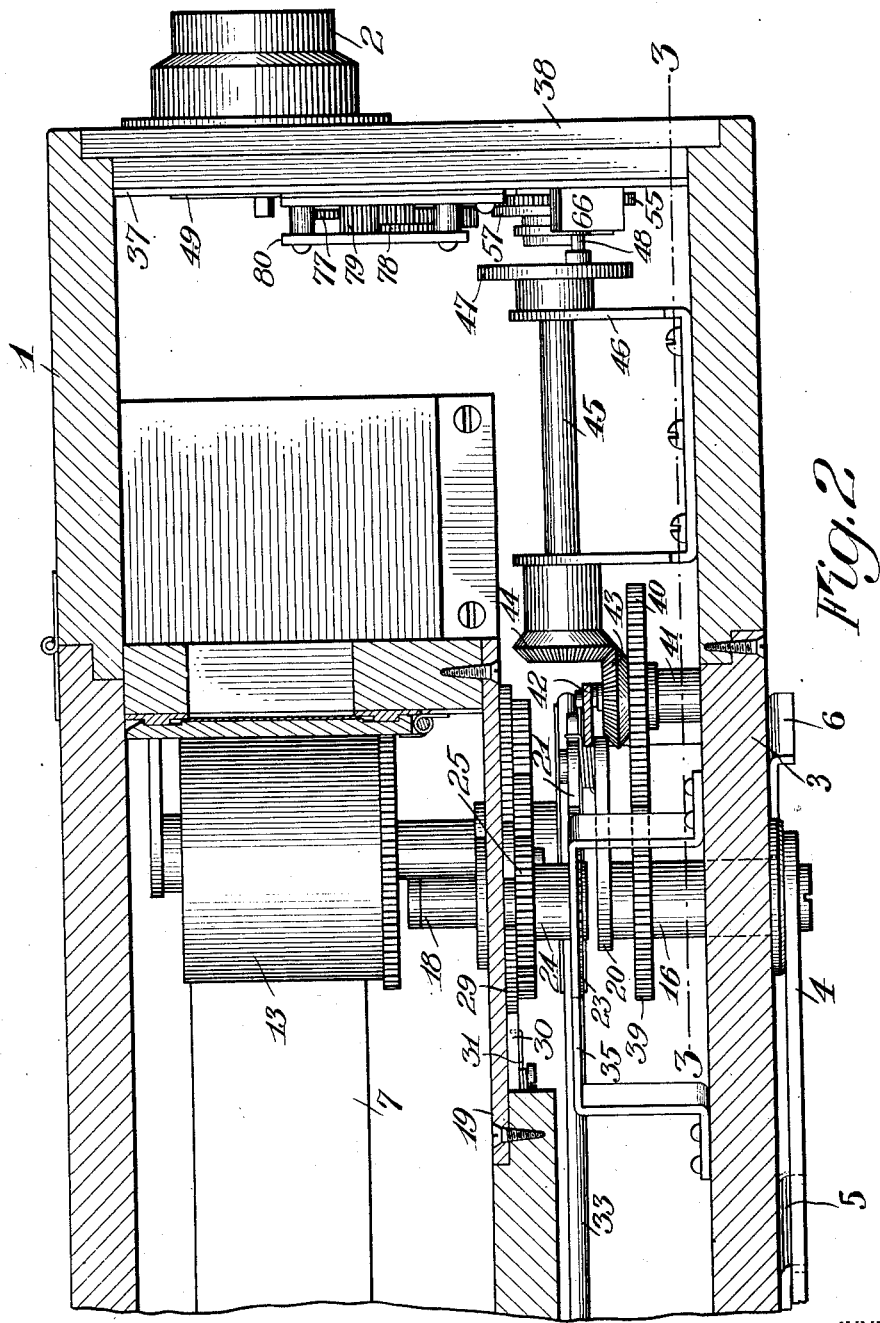

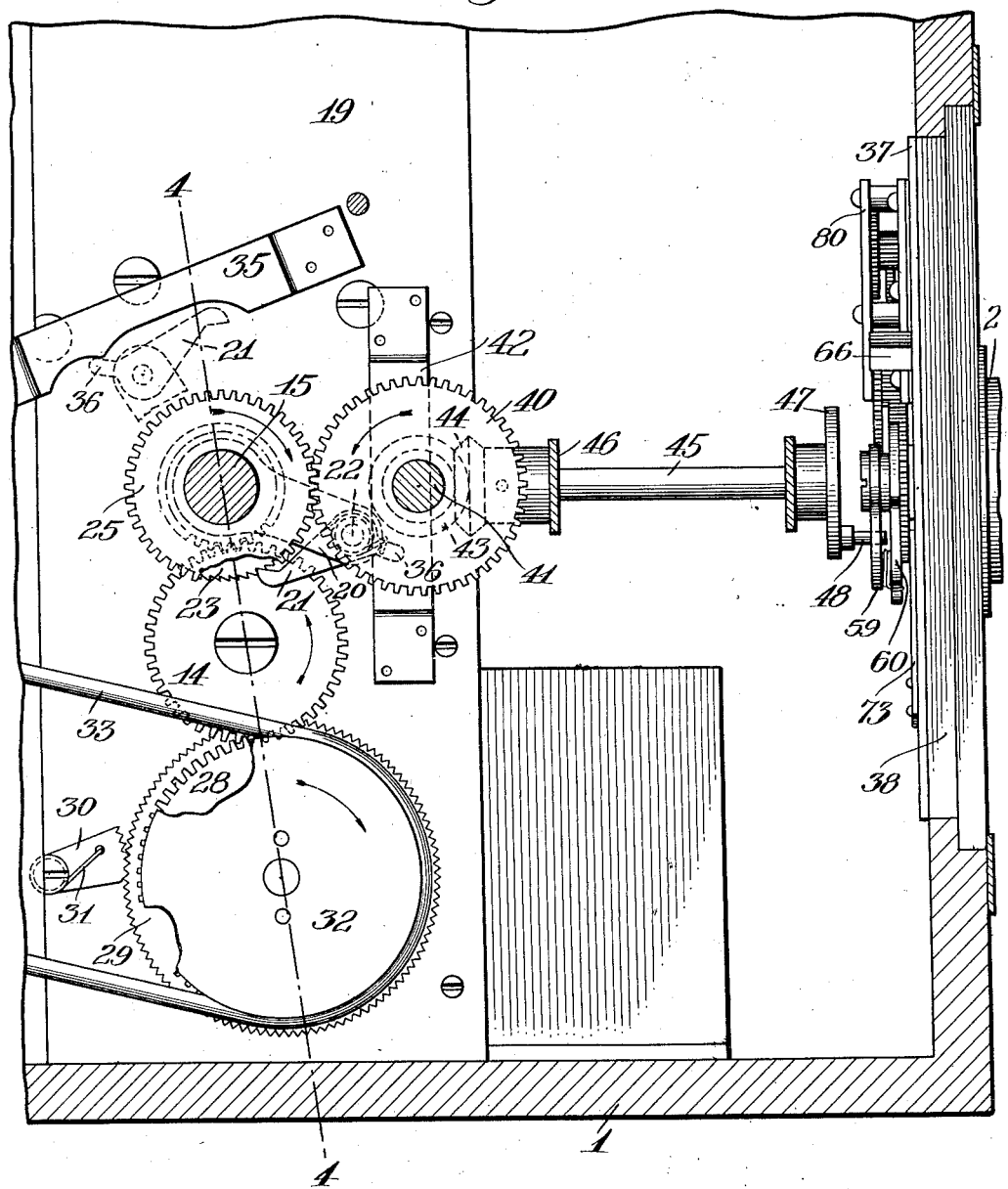

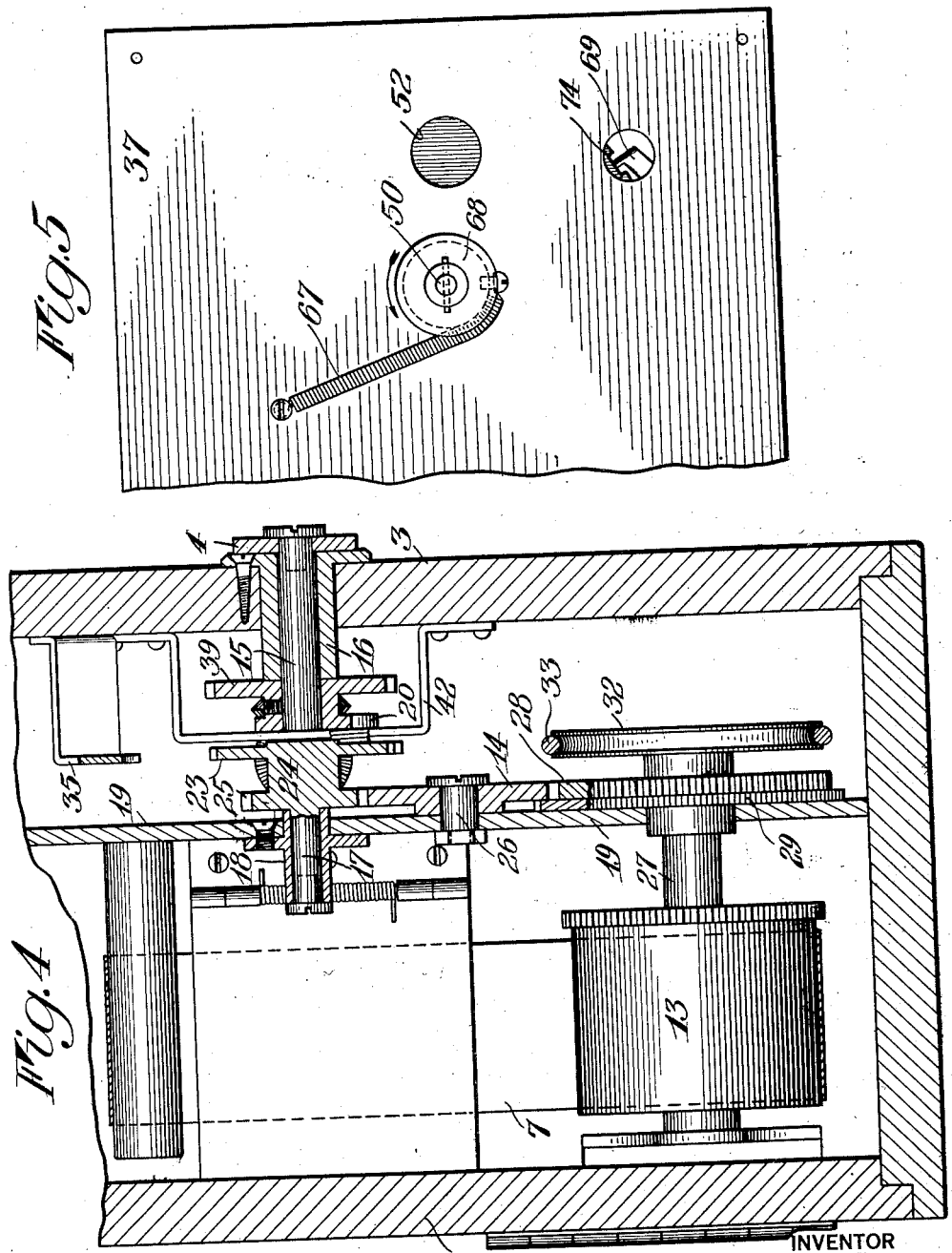

UNITED STATES PATENT OFFICE.

WILLIAM F. FOLMER, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC EXPOSING APPARATUS.

1,383,395.     Specification of Letters Patent.     Patented July 5, 1921.

Application filed January 8, 1919. Serial No. 270,109.

*To all whom it may concern:*

Be it known that I, WILLIAM F. FOLMER, of Rochester, in the county of Monroe and State of New York, have invented certain new and useful Improvements in Photographic Exposing Apparatus; and I do hereby declare the following to be a full, clear, and exact description of the same, reference being had to the accompanying drawings, forming a part of this specification, and to the reference-numerals marked thereon.

My present invention relates to photography and more particularly to photographic cameras and it has for its object to provide, in combination with a film feeding mechanism, an improved shutter that will be set and operated in continuation of the same movement that feeds the fresh area of film into the focal plane, the aim being to provide a camera in which one stroke of a single operating member will automatically both feed and expose the film. The improvements are directed in part toward producing a strong and serviceable mechanism that will at the same time be convenient to operate and simple in its construction. To these and other ends the invention resides in certain improvements and combinations of parts all as will be hereinafter more fully described, the novel features being pointed out in the claims at the end of the specification.

In the drawings:

Figure 1 is a side elevation of a camera constructed in accordance with and illustrating one embodiment of my invention, the film feeding arrangements being outlined in dotted lines;

Fig. 2 is an enlarged fragmentary horizontal section therethrough, taken substantially on the line 2—2 of Fig. 1;

Fig. 3 is a vertical section taken substantially on the line 3—3 of Fig. 2, parts being broken away;

Fig. 4 is an enlarged fragmentary transverse section taken substantially on the line 4—4 of Fig. 3;

Fig. 5 is an enlarged front view of the shutter plate; and

Figs. 6 and 7 are enlarged rear views of the shutter plate and shutter mechanism, showing the latter in different positions.

Similar reference numerals throughout the several views indicate the same parts.

The present camera is designed for the purpose of making small photographs of a large number of persons in rapid succession to provide identification data in factories, military establishments, etc., and the film used is preferably the ordinary motion picture film, unperforated. To first give an idea of the general arrangement and referring more particularly to Fig. 1, 1 indicates the camera box or body, and 2 the lens tube while 3 is a panel upon which most of the operating mechanism is mounted. On the exterior of the camera box is an operating crank 4 having a normal position against a stop 5. Its forward movement from the full line position of Fig. 1 to the dotted line position against another limiting stop 6, performs the film winding and shutter operating functions. The film indicated at 7 has the stretch indicated at 8 in the focal plane of the camera. It is wound from a feed roll 9 in a roll holder 10 to a take-up roll 11 in a roll holder 12 by means of an intermediate feed roll 13. The feed roll is turned by the crank 4 through an intermediate gear 14 and other mechanism that will now be described.

Referring additionally to Figs. 2 and 4, the shaft 15 of the crank 4 has an extended bearing in a bushing 16 in the panel 3. In axial alinement with it, is another shaft 17 turning in a bushing 18 mounted in a longitudinal partition wall 19 that extends from front to rear within the camera body. Fixed to the inner end of the shaft 15 is an arm 20 (see also Fig. 3) having a spring-actuated pawl 21 pivoted thereon at 22. This pawl is offset into the plane of a ratchet wheel 23 on a hub 24 of the shaft 17. Also integral with this ratchet and hub is a pinion 25 that meshes with the intermediate gear 14 of the film feed mechanism heretofore referred to, the gear 14 being also mounted by means of a stud 26 in the partition 19. The feed roll 13 for the film is carried by a shaft 27 having a bearing in the partition 19 and also in the opposite wall of the camera body and fixed on this shaft is a gear 28 with which the gear 14 meshes.

It will be seen from the foregoing that on the forward throw of the operating crank 4 the ratchet 23 will be engaged by the pawl 21 and will, through the intermediate gearing, turn the feed roll 13. As the crank 4 returns to its rearward position, the pawl will ride idly over the ratchet so that the feed wheel is rotated intermittently in one direction only. In order to prevent any retrograde movement whatever, a ratchet wheel 29 fixed to the gear 28 is engaged by a locking pawl 30 actuated by a spring 31 and mounted on the partition 19.

The take-up roll 11 for the film must also be driven but as it is constantly increasing in size, it can not be driven positively. I therefore mount a grooved pulley 32 on the shaft 27 over which runs a belt 33 that runs back to a similar pulley 34 on the take-up roll 11, this pulley being shown only in dotted lines in Fig. 1. When the take-up of the roll 11, due to its increased diameter, exceeds the feed of the roller 13, the belt 33 slips and this slippage compensates for the difference in the two rates of feed.

The complete movement of the new area of film into the focal plane of the camera occurs as a result of only the first part of the movement of the operating crank 4, as I provide means for disconnecting it from the film feeding devices before it completes its forward throw. This means consists, in the present instance, of a cam plate 35 in the nature of a bracket offset from the panel 3 and secured thereto. The pawl 21 has a tail 36 thereon and when it has traveled from the normal full line position of Fig. 3, as far as the dotted line position, the tail 36 rides the cam plate 35 and the pawl is disengaged from the ratchet 23, so that thereafter the crank shaft 15 turns independently of the shaft 17.

The balance of the throw of the operating crank is utilized to actuate the shutter mechanism and expose the film that has been fed. Referring to Fig. 2, and briefly to Fig. 6, the shutter mechanism is carried on a plate 37 secured to the front wall 38 of the camera body. Fixed to the crank shaft 15 is a gear 39 that meshes with a gear 40 on a short parallel shaft 41 a bearing for the end of which is provided in a bracket 42 secured to the panel 3. This shaft also carries a bevel pinion 43 meshing with a bevel pinion 44 on a shaft 45 supported in a bracket 46 on an inner wall of the camera, said shaft extending horizontally from front to rear of the camera. At its opposite end, the shaft 45 carries a disk 47 having an eccentric crank pin 48 thereon. This crank pin constitutes the connecting element between the operating crank and winding mechanism and the shutter mechanism and actuates the shutter operating member hereinafter described.

The shutter mechanism is shown detached in Figs. 6 and 7 and as before stated, is mounted entirely upon the shutter plate 37. The shutter comprises a shutter leaf or plate 49 loosely mounted on a shaft 50 and having an aperture 51 movable into and out of register with a lens opening 52 in the shutter plate 37, the shaft 50 being mounted to turn in the plate. Fixed to the said shaft is a gear 53 fixed to a cover blind 54 adapted to swing across and close both of the apertures 51 and 52. Meshing with this gear is a driving gear 55 loosely mounted on a pivot 56 and having a hub 57 provided with a notch 58. Also loosely mounted on the pivot 56 is an arm 59 having a spring actuated pawl 60 pivoted thereto at 61. In the arm 59 is a slot 62 with which coöperates the crank pin 48 on the disk 47 that is turned with the film feeding mechanism. Upon each throw of the operating crank 4, the crank pin 48 describes an arc that carries the pawl 60 around from the full line position of Fig. 6 to the position of Fig. 7. As the pawl is normally in engagement with the notch 58, this motion rotates both gears 55 and 53 and carries the cover blind 54 and shutter 49 from the normal full line position of Fig. 6 to the dotted line set position. In doing this, the cover blind 54 first moves alone until it covers the aperture 51 in the shutter, at which point a pin 63 on the shutter plate is engaged by the end wall of a segmental slot 64 in the gear 53, which slot permits the independent movement of the shutter blind. As soon as the said pin is engaged, the gear carries the shutter blade around also with the cover blind still over its aperture 51 which prevents exposure during the setting movement.

When the pawl 60 has reached the point of its setting movement shown in dotted lines in Fig. 6, a tail 65 thereon abuts against a stop 66 which trips the pawl and throws it out of engagement with the notch 58. This permits the cover blind to return under the influence of a spring 67 on the front of the plate 37 (see Fig. 5) which spring, during the setting movement, winds on a grooved pulley 68 fixed to the shaft 50. In so doing, the cover blind uncovers the aperture 51 of the shutter which is then in register with the lens aperture 52 and the exposure is started, but the shutter maintains the position of Fig. 7 due to the action of a spring actuated catch 69 pivoted at 70 to the plate 37 and locking into a notch 71 in the edge of the shutter. Immediately thereafter, however, a cam 72 on the cover blind engages and trips this latch just before the other end wall of the segmental slot 64 engages the pin 63 on the shutter to rotate it with the cover blind to normal position. In this way, the cover blind and shutter are returned in succession by the spring 67 and they are halted and the shock of the impact absorbed by a leaf spring 73 which engages the edge of the shutter. The shutter leaf 49 is normally locked in its closed position by the engagement of the latch 69 with another notch 74 in its edge. This engagement of the latch is also released by the cam 72 on the cover blind when the latter is moving independently to set position. The operating arm 59 and pawl 60 are, of course, returned by the operating crank 4 and the pawl reëngages in the notch 58 of the gear 55.

To slow the exposing movements down to the desired duration and to prevent a too choppy action under the influence of the spring 67, I employ a retarding mechanism which, in the present instance, comprises a gear train embodying a pinion 75 meshing with the gear 53 on the cover blind and gears 76, 77, 78 and 79 all set beneath a bearing plate 80.

I claim as my invention:

1. In a camera, the combination with a film feeding roll and gearing including a ratchet for turning said roll, of a shaft having an operating crank thereon, a pawl on said shaft coöperating with the ratchet to drive the feed gearing intermittently in one direction, a shutter mechanism, and a shutter winding and releasing member driven in two directions by the operating shaft but adapted to wind and then to release the shutter during its movement in only one of said directions.

2. In a camera, the combination with a film feeding roll and gearing including a ratchet for turning said roll, of a shaft having an operating crank thereon, a pawl on said shaft coöperating with the ratchet to drive the feed gearing intermittently in one direction, a shutter mechanism, a pawl for setting the same, a shutter operating member adapted to actuate the pawl and driven in two directions by the operating shaft, means for tripping the feed pawl and means for thereafter tripping the shutter pawl and releasing the shutter.

3. In a camera, the combination with a film feeding roll and a crank, a transverse shaft and gearing for operating said roll, of a shutter at the front of the camera, a longitudinal shaft geared to the transverse shaft and a crank on the said longitudinal shaft for operating the shutter mechanism.

4. In a camera, the combination with a film feeding roll and a crank, a transverse shaft and gearing for operating said roll, of a shutter at the front of the camera, embodying blades, a spring for actuating the blades in one direction and a rotary element having a pawl thereon for actuating them in the other direction, a longitudinal shaft geared to the transverse shaft, a crank on the said longitudinal shaft for turning the rotary element and pawl and means for tripping the pawl when the shutter has reached a predetermined position.

WILLIAM F. FOLMER.